United States Patent
Chen et al.

(10) Patent No.: US 6,972,924 B1
(45) Date of Patent: Dec. 6, 2005

(54) DISK DRIVE ATTENUATING EXCITATION OF ARM VIBRATION MODE BY SIMULTANEOUSLY DRIVING SECONDARY ACTUATOR FOR NON-ACTIVE HEAD

(75) Inventors: Yih-Jen Dennis Chen, Fremont, CA (US); Jiasheng Zhu, San Jose, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/816,997

(22) Filed: Apr. 2, 2004

(51) Int. Cl.$^7$ ............................................. G11B 5/596
(52) U.S. Cl. ............................. 360/78.05; 360/294.4
(58) Field of Search .................... 360/78.05, 75, 360/78.12, 264.4, 264.5, 294.4

(56) References Cited

U.S. PATENT DOCUMENTS

| | | | |
|---|---|---|---|
| 5,471,734 A | 12/1995 | Hatch et al. | |
| 6,034,834 A * | 3/2000 | Yoshikawa et al. | 360/75 |
| 6,100,623 A | 8/2000 | Huang et al. | 310/317 |
| 6,157,522 A | 12/2000 | Murphy et al. | 360/294.6 |
| 6,515,834 B1 * | 2/2003 | Murphy | 360/294.4 |
| 6,542,326 B1 * | 4/2003 | Ell et al. | 360/78.05 |
| 6,583,964 B1 | 6/2003 | Huang et al. | 360/78.05 |
| 6,600,619 B1 * | 7/2003 | Morris et al. | 360/75 |
| 6,614,613 B1 * | 9/2003 | Huang et al. | 360/75 |
| 6,621,653 B1 | 9/2003 | Schirle | 360/78.12 |
| 6,624,982 B2 * | 9/2003 | Masuda et al. | 360/78.12 |
| 6,624,983 B1 | 9/2003 | Berding | 360/294.6 |
| 6,690,551 B2 * | 2/2004 | Shiraishi et al. | 360/294.4 |
| 6,697,211 B2 * | 2/2004 | Koganezawa | 360/75 |
| 6,765,743 B2 * | 7/2004 | Goodman et al. | 360/75 |
| 2002/0122267 A1 * | 9/2002 | Morioka | 360/75 |
| 2003/0147181 A1 | 8/2003 | Shiraishi et al. | 360/294.4 |
| 2004/0095672 A1 * | 5/2004 | Price | 360/78.05 |

* cited by examiner

*Primary Examiner*—David Hudspeth
*Assistant Examiner*—James L Habermehl
(74) *Attorney, Agent, or Firm*—Howard H. Sheerin, Esq.

(57) ABSTRACT

A disk drive is disclosed employing a primary actuator for rotating an actuator arm about a pivot in coarse movements, and first and second secondary actuators coupled to the actuator arm for actuating first and second heads in fine movements. A servo control system generates a first control signal applied to the first secondary actuator to position the first head over the first disk surface in fine movements while accessing the first disk surface. The servo control system phase shifts the first control signal by a predetermined phase to generate a second control signal applied to the second secondary actuator to attenuate excitation of at least one arm vibration mode.

16 Claims, 4 Drawing Sheets

DISK DRIVE ATTENUATING EXCITATION OF ARM VIBRATION MODE BY SIMULTANEOUSLY DRIVING SECONDARY ACTUATOR FOR NON-ACTIVE HEAD

BACKGROUND OF THE INVENTION

1. Field of the Invention

The present invention relates to disk drives for computer systems. More particularly, the present invention relates to a disk drive attenuating excitation of arm vibration mode by simultaneously driving a secondary actuator for a non-active head.

2. Description of the Prior Art

FIG. 1A is a diagram of a prior art disk drive 2 wherein a disk 4 stores a plurality of radially spaced, concentric data tracks. A head 6 is positioned radially over the disk 4 in order to access a target track during write/read operations. The head 6 is attached to the distal end of a suspension 8, and the base end of the suspension 8 is attached to the distal end of an actuator arm 12. The actuator arm 12 is rotated about a pivot 14 by a voice coil motor (VCM) 16 to thereby actuate the head 6 radially over the disk 4.

The track density (number of tracks per inch) is limited by the frequency response of the servo system. One known technique for increasing the bandwidth of the servo system is to employ a dual-stage actuator wherein a primary actuator (e.g., the VCM 16) performs coarse movements and a secondary actuator performs small movements for fine-tuning and tracking. In the prior art example of FIG. 1A, a secondary actuator 18 actuates the base of the suspension 8 to generate small radial movement of the head 6. The secondary actuator 18 typically employs piezoelectric (PZT) elements as the actuating device. PZT elements deform when a suitable control voltage is applied thereby actuating a mechanical component such as the base end of the suspension 8.

The servo control loop is implemented as a position control system wherein the position of the head 6 is determined by reading position information recorded in embedded servo sectors on the disk 4 (e.g., track number for coarse position information and servo bursts for fine position information). The read signal 20 emanating from the head 6 is demodulated by a read/write channel 22 into digital information 24 processed by a position detector 26 which generates a signal 28 representing the position of the head 6. The signal 28 is subtracted from a reference input 30 to generate a position error signal (PES) 32. The PES 32 is applied to a VCM controller 34 which generates a control signal 36 applied to the VCM 16. The PES 32 is also applied to a PZT controller 38 which generates a control signal 40 applied to the PZT elements of the secondary actuator 18.

A multi-platter disk drive employs a number of actuator arms which are rotated by the VCM 16 as shown in FIG. 1B. Each inner actuator arm (e.g., arm 42) has connected to the distal end a top and bottom suspension (e.g., suspensions 44A and 44B connected to the distal end of actuator arm 42), and each suspension is actuated by a respective secondary actuator (e.g., secondary actuators 46A and 46B). Typically only one disk surface is accessed at a time during write/read operations, and therefore only the corresponding secondary actuator is driven by the PZT controller 38.

Seeking and tracking operations can excite vibration modes of the arm assembly and actuators that may interfere with the frequency response of the servo system. In particular, exciting the arm torsion and arm sway modes can limit the servo bandwidth leading to excessive settling times, poor disturbance rejection, and poor tracking. Prior art techniques for addressing this problem include systems that compensate for and/or attenuate the arm vibration modes. For example, U.S. Pat. No. 6,621,653 uses a secondary actuator for a non-active head (one not being driven during seeking and tracking) to sense the arm vibration modes and to generate a control signal applied to the secondary actuator for the active head to compensate for the arm vibration modes. U.S. Pat. No. 6,583,964 discloses to attach a mode-canceling actuator (such as a PZT) to the arm assembly and to drive the mode-canceling actuator so as to attenuate the arm vibration modes. However, attaching a separate mode-canceling actuator to the arm assembly increases the expense of the servo system. Further, the '964 patent suggests complicated and expensive circuitry for generating the appropriate control signals applied to the mode-canceling actuator.

There is, therefore, a need for a cost-effective technique for attenuating arm vibration modes in the servo system of a disk drive.

SUMMARY OF THE INVENTION

The present invention may be regarded as a disk drive comprising a first disk surface and a second disk surface, an actuator arm, a first head coupled to a distal end of the actuator arm and positioned over the first disk surface, and a second head coupled to a distal end of the actuator arm and positioned over the second disk surface. A primary actuator rotates the actuator arm about a pivot in coarse movements, a first secondary actuator coupled to the actuator arm actuates the first head over the first disk surface in fine movements, and a second secondary actuator coupled to the actuator arm actuates the second head over the second disk surface in fine movements. A first control signal is applied to the first secondary actuator to position the first head over the first disk surface in fine movements while accessing the first disk surface. The first control signal is phase shifted by a predetermined phase to generate a second control signal applied to the second secondary actuator to attenuate excitation of at least one arm vibration mode.

In one embodiment, the primary actuator comprises a voice coil motor, and in one embodiment the first and second actuators comprise a piezoelectric element.

In another embodiment, the disk drive further comprises a first suspension having a base end coupled to the actuator arm and a distal end coupled to the first head, and a second suspension having a base end coupled to the actuator arm and a distal end coupled to the second head. The first secondary actuator applies an actuating force to the base end of the first suspension, and the second secondary actuator applies an actuating force to the base end of the second suspension. In one embodiment, the first secondary actuator is coupled to the actuator arm proximate the base of the first suspension, and the second secondary actuator is coupled to the actuator arm proximate the base of the second suspension. In another embodiment, the first secondary actuator is coupled to a first side of the actuator arm, a first linkage extends along the first side of the actuator arm and couples the first secondary actuator to the first suspension, the second secondary actuator is coupled to a second side of the actuator arm, and a second linkage extends along the second side of the actuator arm and couples the second secondary actuator to the second suspension.

In yet another embodiment, the disk drive further comprises a first mounting bracket for mounting the first head and a second mounting bracket for mounting the second head, a first suspension comprising a base end coupled to the actuator arm and a distal end coupled to the first mounting bracket, and a second suspension comprising a base end coupled to the actuator arm and a distal end coupled to the second mounting bracket. The first secondary actuator applies an actuating force to the first mounting bracket, and the second secondary actuator applies an actuating force to the second mounting bracket.

In one embodiment, the predetermined phase that the first control signal is shifted is approximately 180 degrees to attenuate excitation of an arm torsion mode. In another embodiment, the predetermined phase is approximately zero degrees to attenuate excitation of an arm sway mode.

The present invention may also be regarded as a method of attenuating excitation of at least one arm vibration mode in a disk drive. The disk drive comprises a first disk surface and a second disk surface, an actuator arm, a first head coupled to a distal end of the actuator arm and positioned over the first disk surface, a second head coupled to a distal end of the actuator arm and positioned over the second disk surface. The disk drive further comprises a primary actuator for rotating the actuator arm about a pivot in coarse movements, a first secondary actuator coupled to the actuator arm for actuating the first head over the first disk surface in fine movements, and a second secondary actuator coupled to the actuator arm for actuating the second head over the second disk surface in fine movements. A first control signal is applied to the first secondary actuator to position the first head over the first disk surface in fine movements while accessing the first disk surface. The first control signal is phase shifted by a predetermined phase to generate a second control signal applied to the second secondary actuator to attenuate excitation of at least one arm vibration mode.

DESCRIPTION OF THE PREFERRED EMBODIMENTS

Figure 1A:
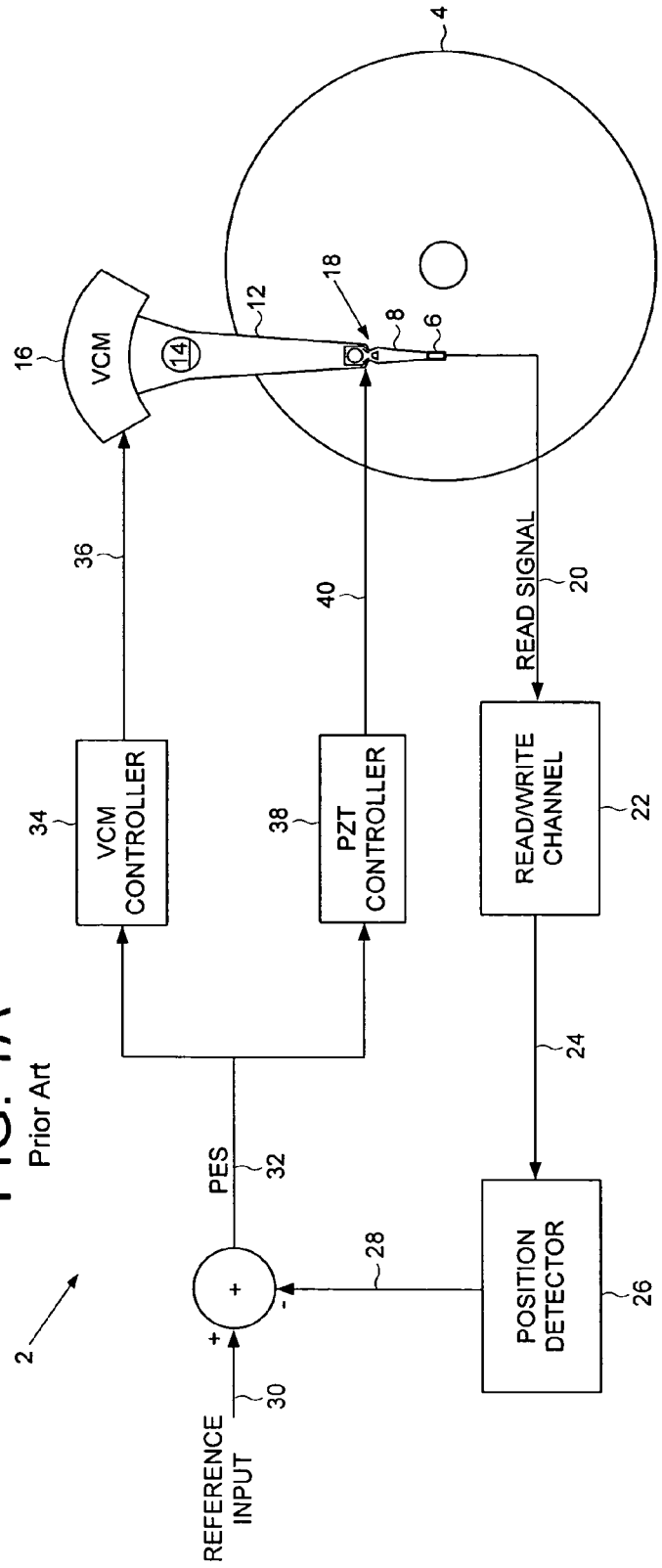
FIG. 1A shows an overview of a prior art disk drive employing a primary VCM actuator for actuating an actuator arm in coarse movements and a secondary PZT actuator for actuating a suspension in fine movements.
Figure 1B:
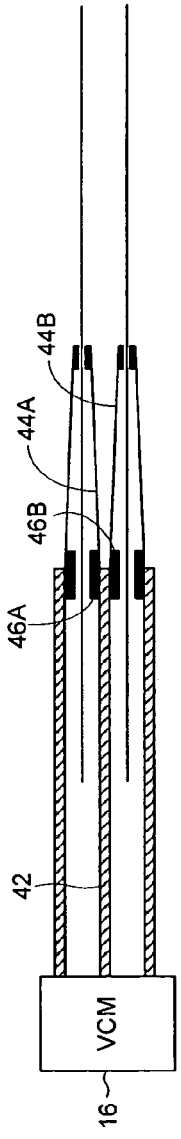
FIG. 1B illustrates a prior art multi-platter disk drive wherein an inner actuator arm comprises a top and bottom secondary actuator for actuating top and bottom suspensions.
Figure 2:
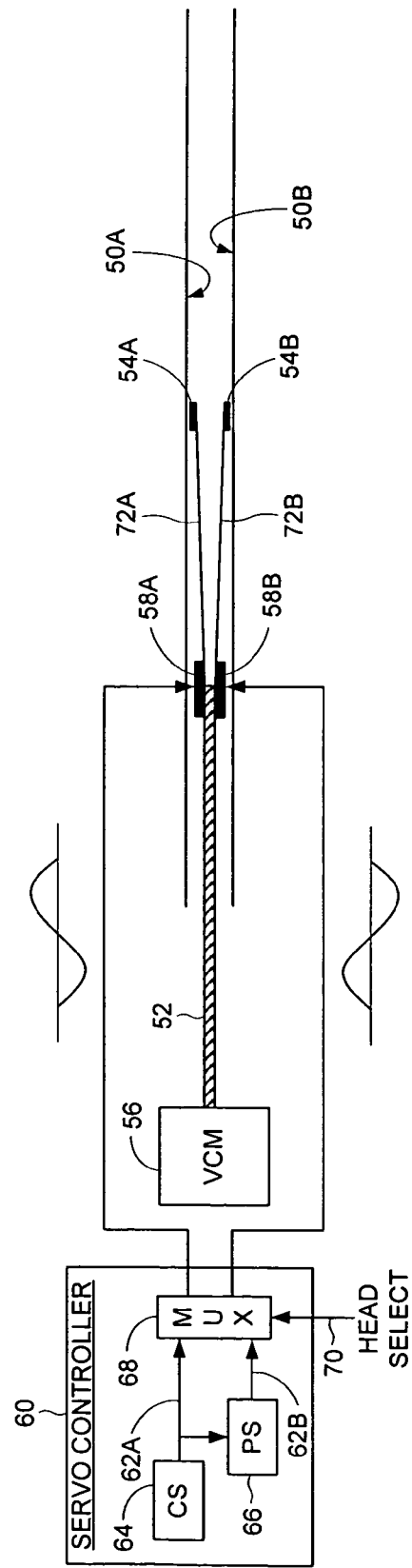
FIG. 2 shows an embodiment of the present invention wherein a first control signal is applied to a first secondary actuator to actuate an active head, the first control signal is phase shifted by a predetermined phase to generate a second control signal, and the second control signal is applied to a second secondary actuator of a non-active head to attenuate excitation of at least one arm vibration mode.

FIG. 2 shows a disk drive according to an embodiment of the present invention comprising a first disk surface 50A and a second disk surface 50B, an actuator arm 52, a first head 54A coupled to a distal end of the actuator arm 52 and positioned over the first disk surface 50A, and a second head 54B coupled to a distal end of the actuator arm 52 and positioned over the second disk surface 50B. A primary actuator 56 rotates the actuator arm 52 about a pivot in coarse movements, a first secondary actuator 58A coupled to the actuator arm 52 actuates the first head 54A over the first disk surface 50A in fine movements, and a second secondary actuator 58B coupled to the actuator arm 52 actuates the second head 54B over the second disk surface 50B in fine movements. A servo controller 60 generates and applies a first control signal 62A to the first secondary actuator 58A to position the first head 54A over the first disk surface 50A in fine movements while accessing the first disk surface 50A. The servo controller 60 phase shifts the first control signal 62A by a predetermined phase to generate a second control signal 62B applied to the second secondary actuator 58B to attenuate excitation of at least one arm vibration mode.

The servo controller 60 of FIG. 2 is responsive to a PES signal representing the position error of the active head. In one embodiment, the PES signal is filtered wherein the low frequency component of the PES is used to actuate the primary actuator (the VCM 56) and the high frequency component is used to actuate the secondary actuator for the active head. The servo controller 60 comprises a suitable control signal generator (CS) 64 for generating the first control signal 62A and a suitable phase shifting circuit (PS) 66 for phase shifting the first control signal 62A to generate the second control signal 62B. The servo controller 60 further comprises a multiplexer 68 controlled by a head select signal 70 which selects the active head for accessing a target disk surface. The multiplexer 68 applies the first control signal 62A to the secondary actuator to actuate the active head, and applies the second control signal 62B to the secondary actuator on the same arm to attenuate excitation of at least one arm vibration mode.

Figure 3A:
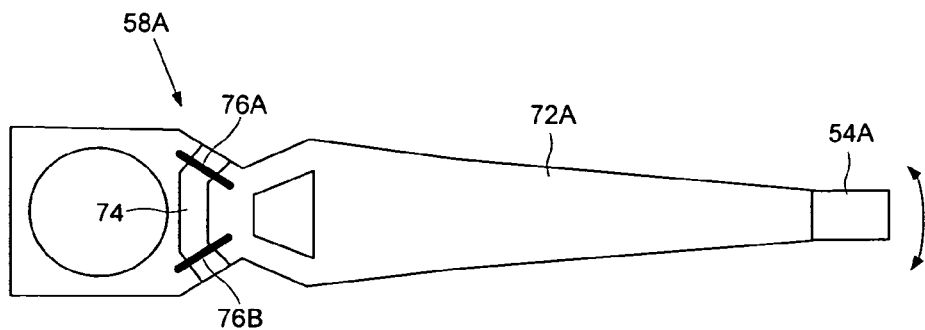
FIG. 3A shows an embodiment of the present invention wherein the secondary actuator comprises PZT elements for actuating a base of the suspension.

In the embodiment of FIG. 2, the heads 54A and 54B are coupled to respective suspensions 72A and 72B for biasing the heads 54A and 54B toward the respective disk surfaces 50A and 50B. A base end of the suspensions 72A and 72B are coupled to the actuator arm 52 and the secondary actuators 58A and 58B apply an actuating force to the base of the suspensions. FIG. 3A shows a suitable secondary actuator for applying an actuating force to the base of the suspension. An aperture 74 extends across the suspension 72A to form a hinge, and a pair of PZT elements 76A and 76B are mounted across the aperture 74. When the PZT elements 76A and 76B are driven by the control signal 62A, they deform so that the suspension 72A deflects in the direction indicated by the arrows thereby actuating the head 54A over the disk surface.

Figure 3B:
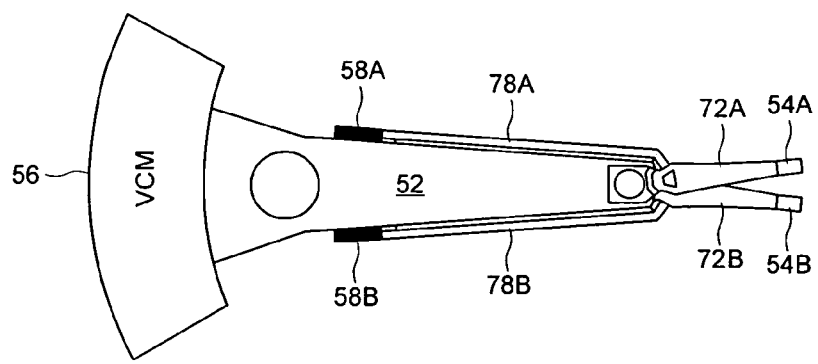
FIG. 3B shows an embodiment of the present invention wherein the PZT elements for actuating the base of the suspension are coupled to a side of the actuator arm.

Any suitable secondary actuator assembly may be employed in the embodiments of the present invention. FIG. 3B shows an embodiment wherein the first and second secondary actuators 58A and 58B (e.g., PZT elements) are coupled to the sides of the actuator arm 52. A first linkage 78A extends along one side of the actuator arm 52 and couples the first secondary actuator 58A to the first suspension 72A. A second linkage 78B extends along the opposite side of the actuator arm 52 and couples the second secondary actuator 58B to the second suspension 72B. When the secondary actuators 58A and 58B are driven by the control signal 62A, the linkages 78A and 78B apply an actuating force which deflects the suspensions 72A and 72B to actuate the respective heads 54A and 54B over the disk surface.

Figure 3C:
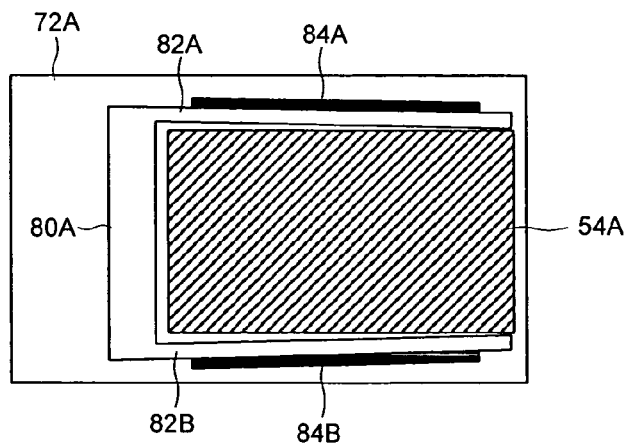
FIG. 3C shows an embodiment of the present invention wherein the secondary actuator comprises PZT elements for actuating a mounting bracket for the head.

FIG. 3C shows yet another embodiment of a suitable secondary actuator wherein a mounting bracket 80A is coupled to the suspension 72A for mounting the head 54A. The mounting bracket 80A has a pair of arms 82A and 82B that extend along the side of the head 54A and contact the head 54A at the distal ends of the arms 82A and 82B. A pair of PZT elements 84A and 84B coupled to the arms 82A and 82B apply an actuating force that deflects the arms to thereby actuate the head 54A over the disk surface.

Figure 4:
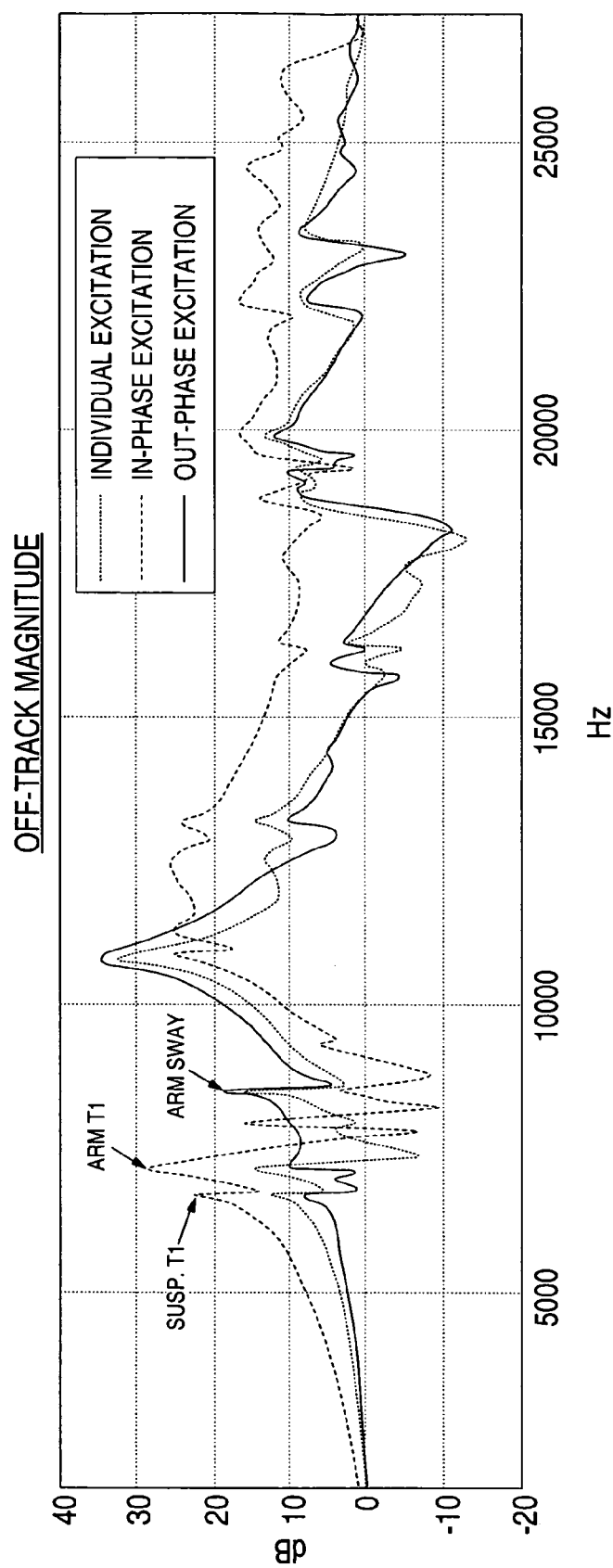
FIG. 4 is a frequency plot illustrating how the present invention attenuates excitation of at least one arm vibration mode including an arm torsion mode and an arm sway mode.

FIG. 4 is a frequency plot of the off-track magnitude for a dual-stage actuator system illustrating a number of vibration modes, including a first suspension torsion mode (SUSP. T1), a first arm torsion mode (ARM T1), and an arm sway mode (ARM SWAY). The plot shows the frequency response when the secondary actuators on the same arm are driven individually, when driven simultaneously 180 degrees out-of-phase, and when driven simultaneously in-phase (zero degree phase-shift). Driving the secondary actuators 180 degrees out-of-phase reduces the net momentum on the arm which attenuates the first arm torsion mode (ARM T1), whereas driving the secondary actuators in-phase reduces the net lateral force on the arm which attenuates the arm sway mode (ARM SWAY).

The degree to which the first control signal 62A is phase shifted to generate the second control signal 62B depends on the operating characteristics of the dual-stage servo system. In the example shown in FIG. 4, the first arm torsion mode occurs at a lower frequency than the arm sway mode. For this system it may be desirable to attenuate the lowest frequency arm vibration mode (first arm torsion mode) and therefore the phase shift is selected to be 180 degrees. In a different dual-stage servo system the arm sway mode may occur at a lower frequency than the first arm torsion mode and therefore a zero degree phase shift selected to attenuate the arm sway mode. For yet another dual-stage servo system, the magnitude of first arm torsion mode may be significantly less than the arm sway mode (irrespective of frequency) and therefore a zero degree phase shift selected to attenuate the arm sway mode.

Phase shifting the first control signal 62A by zero or 180 degrees simplifies the implementation of the phase shifting circuit 66 in FIG. 2. If the phase shift is zero degrees, the phase shifting circuit 66 merely generates the second control signal 62B as a "pass-through" of the first control signal 62A. If the phase shift is 180 degrees, the phase shifting circuit 66 merely inverts the first control signal 62A to generate the second control signal 62B (e.g., using a differential amplifier). In one embodiment, the first control signal 62A is inverted by assembling the secondary actuators so that the PZT elements have opposite polarity. That is, the polarity of the PZT elements of the first secondary actuator 58A is configured opposite the polarity of the PZT elements of the second secondary actuator 58B. In this manner the first control signal 62A can simply be applied to both secondary actuators 58A and 58B to achieve the desired opposing actuation.

We claim:

1. A disk drive comprising:
   (a) a first disk surface and a second disk surface;
   (b) an actuator arm;
   (c) a first head coupled to a distal end of the actuator arm and positioned over the first disk surface;
   (d) a second head coupled to a distal end of the actuator arm and positioned over the second disk surface;
   (e) a primary actuator for rotating the actuator arm about a pivot in coarse movements;
   (f) a first secondary actuator coupled to the actuator arm for actuating the first head over the first disk surface in fine movements;
   (g) a second secondary actuator coupled to the actuator arm for actuating the second head over the second disk surface in fine movements;
   (h) a servo controller for:
      generating a first control signal applied to the first secondary actuator to position the first head over the first disk surface in fine movements while accessing the first disk surface; and
      phase shifting the first control signal by a predetermined phase to generate a second control signal applied to the second secondary actuator to attenuate excitation of at least one arm vibration modes
   wherein:
      the first secondary actuator is coupled to a first side of the actuator arm;
      a first linkage extends along the first side of the actuator arm and couples the first secondary actuator to the first suspension;
      the second secondary actuator is coupled to a second side of the actuator arm; and
      a second linkage extends along the second side of the actuator arm and couples the second secondary actuator to the second suspension.

2. The disk drive as recited in claim 1, wherein the primary actuator comprises a voice coil motor.

3. The disk drive as recited in claim 1, wherein the first and second secondary actuators comprise a piezoelectric element.

4. The disk drive as recited in claim 1, further comprising:
   (a) a first suspension comprising a base end coupled to the actuator arm and a distal end coupled to the first head; and
   (b) a second suspension comprising a base end coupled to the actuator arm and a distal end coupled to the second head, wherein:
      the first secondary actuator applies an actuating force to the base end of the first suspension; and
      the second secondary actuator applies an actuating force to the base end of the second suspension.

5. The disk drive as recited in claim 4, wherein:
   (a) the first secondary actuator is coupled to the actuator arm proximate the base of the first suspension; and
   (b) the second secondary actuator is coupled to the actuator arm proximate the base of the second suspension.

6. The disk drive as recited in claim 1, further comprising:
   (a) a first mounting bracket for mounting the first head and a second mounting bracket for mounting the second head;
   (b) a first suspension comprising a base end coupled to the actuator arm and a distal end coupled to the first mounting bracket; and
   (c) a second suspension comprising a base end coupled to the actuator arm and a distal end coupled to the second mounting bracket, wherein:
      the first secondary actuator applies an actuating force to the first mounting bracket; and
      the second secondary actuator applies an actuating force to the second mounting bracket.

7. The disk drive as recited in claim 1, wherein the predetermined phase is approximately 180 degrees to attenuate excitation of an arm torsion mode.

8. The disk drive as recited in claim 1, wherein the predetermined phase is approximately zero degrees to attenuate excitation of an arm sway mode.

9. A method of attenuating excitation of at least one arm vibration mode in a disk drive, the disk drive comprising a first disk surface and a second disk surface, an actuator arm, a first head coupled to a distal end of the actuator arm and positioned over the first disk surface, a second head coupled to a distal end of the actuator arm and positioned over the second disk surface, a primary actuator for rotating the actuator arm about a pivot in coarse movements, a first secondary actuator coupled to the actuator arm for actuating the first head over the first disk surface in fine movements, and a second secondary actuator coupled to the actuator arm for actuating the second head over the second disk surface in fine movements, the method comprising the steps of:
   (a) generating a first control signal applied to the first secondary actuator to position the first head over the first disk surface in fine movements while accessing the first disk surface; and
   (b) phase shifting the first control signal by a predetermined phase to generate a second control signal applied to the second secondary actuator to attenuate excitation of at least one arm vibration modes
   wherein:
      the first secondary actuator is coupled to a first side of the actuator arm;
      a first linkage extends along the first side of the actuator arm and couples the first secondary actuator to the first suspension;
      the second secondary actuator is coupled to a second side of the actuator arm;
      a second linkage extends along the second side of the actuator arm and couples the second secondary actuator to the second suspension.

10. The method as recited in claim 9, wherein the primary actuator comprises a voice coil motor.

11. The method as recited in claim 9, wherein the first and second secondary actuators comprise a piezoelectric element.

12. The method as recited in claim 9, wherein the disk drive further comprises a first suspension comprising a base end coupled to the actuator arm and a distal end coupled to the first head and a second suspension comprising a base end coupled to the actuator arm and a distal end coupled to the second head, the method further comprising the steps of:
   (a) the first secondary actuator applying an actuating force to the base end of the first suspension; and
   (b) the second secondary actuator applying an actuating force to the base end of the second suspension.

13. The method as recited in claim 12, wherein:
   (a) the first secondary actuator is coupled to the actuator arm proximate the base of the first suspension; and
   (b) the second secondary actuator is coupled to the actuator arm proximate the base of the second suspension.

14. The method as recited in claim 9, wherein the disk drive further comprises a first mounting bracket for mounting the first head and a second mounting bracket for mounting the second head, a first suspension comprising a base end coupled to the actuator arm and a distal end coupled to the first mounting bracket; and a second suspension comprising a base end coupled to the actuator arm and a distal end coupled to the second mounting bracket, the method further comprising the steps of:
   (a) the first secondary actuator applying an actuating force to the first mounting bracket; and
   (b) the second secondary actuator applying an actuating force to the second mounting bracket.

15. The method as recited in claim 9, wherein the predetermined phase is approximately 180 degrees to attenuate excitation of an arm torsion mode.

16. The method as recited in claim 9, wherein the predetermined phase is approximately zero degrees to attenuate excitation of an arm sway mode.

* * * * *